US007063744B2

(12) United States Patent
Komatsu et al.

(10) Patent No.: US 7,063,744 B2
(45) Date of Patent: Jun. 20, 2006

(54) COATING DEVICE

(75) Inventors: Hiroshi Komatsu, Saijo (JP); Gen Okano, Saijo (JP)

(73) Assignee: Asahi Breweries Ltd., Tokyo (JP)

( * ) Notice: Subject to any disclaimer, the term of this patent is extended or adjusted under 35 U.S.C. 154(b) by 0 days.

(21) Appl. No.: 11/206,343

(22) Filed: Aug. 18, 2005

(65) Prior Publication Data

US 2006/0054083 A1 Mar. 16, 2006

Related U.S. Application Data

(63) Continuation of application No. PCT/JP04/01572, filed on Feb. 13, 2004.

(30) Foreign Application Priority Data

Feb. 18, 2003 (JP) ............................ 2003-040105
Feb. 18, 2003 (JP) ............................ 2003-040106

(51) Int. Cl.
*B05C 1/14* (2006.01)
*B32B 37/12* (2006.01)

(52) U.S. Cl. ....................... 118/257; 118/712; 118/713; 118/239; 118/DIG. 3; 134/127

(58) Field of Classification Search ................ 118/712, 118/713, 106, 239, 257, DIG. 3, 600, 602; 156/278; 134/127, 124, 129, 130, 131; 198/493, 198/495, 496, 500
See application file for complete search history.

(56) References Cited

U.S. PATENT DOCUMENTS

| | | | | |
|---|---|---|---|---|
| 2,868,162 A | * | 1/1959 | Knain | 118/219 |
| 3,083,683 A | * | 4/1963 | Fischer et al. | 118/106 |
| 3,695,223 A | * | 10/1972 | Dunham et al. | 118/217 |

FOREIGN PATENT DOCUMENTS

| | | |
|---|---|---|
| JP | 59-004465 | 1/1984 |
| JP | 1-59221 | 2/1985 |
| JP | 61-046276 | 3/1986 |
| JP | 62-198238 | 12/1987 |
| JP | 2-28822 | 2/1990 |
| JP | 3-94973 | 9/1991 |
| JP | 06-178957 | 6/1994 |
| JP | 07-285655 | 10/1995 |

* cited by examiner

*Primary Examiner*—Laura Edwards
(74) *Attorney, Agent, or Firm*—Milbank, Tweed, Hadley & McCloy LLP

(57) ABSTRACT

There is provided a coating device which can quickly cope with a change in size of a container. A pair of coating belts (annular belts) (11, 15) are arranged on two sides of a conveyor (10). The coating belt (15) is rotated at a high speed while the coating belt (11) is rotated at a low speed. A container (bottle) (1) on the conveyor (10) is coated while being rotated. When the size of the container (1) is to be changed, a pressing roller (57) is moved by an adjusting mechanism (50) in accordance with the size of the container (1).

7 Claims, 5 Drawing Sheets

COATING DEVICE

CROSS-REFERENCE TO RELATED APPLICATION

This is a continuation of International Application PCT/JP04/001572, with an international filing date of Feb. 13, 2004.

TECHNICAL FIELD

The present invention relates to a coating device which coats a container such as a beer bottle.

BACKGROUND ART

Repeatedly used containers, such as beer bottles, rub each other and are damaged in the respective stages, e.g., in the factory, during shipment, during recovery, and the like. Such damages can give an unfavorable impression to consumers. To prevent this, usually, after the containers are filled with a beverage such as beer and labeled, they are coated.

A prior art concerning a coating device is described in Japanese Patent Publication No. 1-59221. Japanese Patent Publication No. 1-59221 discloses a device provided with a coating belt which moves at a speed higher than the moving speed of a conveyor while being kept in contact with containers. While rotating the containers which move together with the conveyor, the device coats the entire surfaces of the containers by the coating belt. According to this device, to prevent that portion of the coating belt which is in contact with the containers from flexing, a tension pulley which can be positionally adjusted in a direction crossing the moving direction of the coating belt is provided at such a position that the coating belt is not in contact with the containers.

In recent years, a demand to use containers having various sizes has arisen. In the coating device described in Japanese Patent Publication No. 1-59221, the gap between the coating belt and a press contact plate or press contact belt which is arranged at a position to oppose the coating belt is fixed. Hence, in the coating device described in Japanese Patent Publication No. 1-59221, to change the size of the containers to be coated, the coating device must be remodeled according to the size of the containers.

In the usage where the size of the containers is changed frequently, frequent remodeling operation is required accordingly. This decreases the device operation hours and the number of containers that can be processed.

In general, after the container coating operation is ended, the coating belt must be cleaned. A coating liquid which drops from the coating belt during coating must be separated from a coating liquid which is washed off from the coating belt during cleaning or a cleaning liquid for cleaning. The coating liquid which drops from the coating belt during coating can be recovered and reused. The cleaning liquid which contains the coating liquid produced during cleaning must be discharged or reused after it is processed appropriately in consideration of the influence to the environment.

A mechanism for separate recovery or discharge must be designed in consideration of the maintenance easiness.

Japanese Patent Publication No. 1-59221 discloses nothing concerning the above respects.

DISCLOSURE OF INVENTION

It is the first object of the present invention to provide a coating device which, for example, can quickly cope with a change in size of containers.

In connection with the first object described above, according to one aspect of the present invention, there is provided a coating device which coats a container, comprising a conveyor which conveys the container, a pair of annular belts which are arranged on two sides of the conveyor to sandwich the container on the conveyor and configured to rotate the container on the conveyor, an adjusting mechanism which adjusts a gap between opposing portions of the pair of annular belts in accordance with a size of the container to be coated, and a supply mechanism which supplies a coating liquid to at least one of the pair of annular belts. With the adjusting mechanism, when changing the size of the container to be coated, device remodeling as in the prior art is not necessary, and a change in size can quickly be coped with. This can greatly reduce a decrease in device operation hours and a decrease in number of containers to be processed. Hence, for example, containers having different sizes can be processed continuously.

According to a preferred embodiment of the present invention, preferably, the adjusting mechanism has a pressing mechanism which is arranged inside, of first and second annular belts that constitute the pair of annular belts, the first annular belt so as to adjust the gap between opposing portions of the first and second annular belts, and the pressing mechanism presses the first annular belt toward the second annular belt by an amount corresponding to a size of the container to be coated. For example, the pressing mechanism can include an adjusting roller which comes into contact with an inner side of the first annular belt and rotates as the first annular belt moves, and a driving mechanism which moves the adjusting roller by an amount corresponding to the size of the container to be coated.

According to another preferred embodiment of the present invention, preferably, the coating device according to the present invention further comprises a movable tension roller to apply a predetermined tension to the first annular belt. In this case, preferably, the coating device according to the resent invention further comprises a second adjusting mechanism which adjusts a position of the tension roller in accordance with one of the size of the container to be coated and a position of the adjusting roller.

According to still another preferred embodiment of the present invention, preferably, the coating device according to the present further comprises an input unit which inputs information concerning the size of the container to be coated, and a control unit which operates the adjusting mechanism on the basis of the information input by the input unit. For example, the input unit can include a camera and be configured to obtain the size of the container by processing an image of the container sensed by the camera.

According to still another preferred embodiment of the present invention, preferably, the coating device according to the present invention further comprises a second supply mechanism which supplies a cleaning liquid to each one of the pair of annular belts, a pair of pans which respectively have discharge ports and receive a liquid dropping from the pair of annular belts to discharge the liquid through the discharge ports, a first discharge channel which receives at a first receiving port the liquid discharged through the discharge ports of the pair of pans and discharges the liquid to a first discharge destination, a second discharge channel which receives at a second receiving port the liquid discharged through the discharge ports of the pair of pans and discharges the liquid to a second discharge destination, and a driving mechanism to position both of the discharge ports of the pair of pans above one of the first and second receiving ports.

According to another aspect of the present invention, there is provided a coating device which coats a container, comprising a conveyor which conveys the container, an annular belt which is arranged on a side of the conveyor to come into contact with a side surface of the container on the conveyor and configured to rotate the container, an adjusting mechanism which adjusts a position of a portion of the annular belt which is in contact with the container on the conveyor in accordance with a size of the container to be coated, and a supply mechanism which supplies a coating liquid to the annular belt. With the adjusting mechanism, when changing the size of the container to be coated, device remodeling as in the prior art is not necessary, and a change in size can quickly be coped with. This can greatly reduce a decrease in device operation hours and a decrease in number of containers to be processed. Hence, for example, containers having different sizes can be processed continuously.

It is the second object of the present invention to provide a coating device which, for example, has a function of discharging or recovering a liquid produced during coating and a liquid produced during cleaning separately and which can be maintained easily.

In connection with the second object described above, according to still another aspect of the present invention, there is provided a coating device which coats a container, comprising a conveyor which conveys the container, an annular belt which is arranged to come into contact with a side surface of the container on the conveyor and configured to rotate the container, a first supply mechanism which supplies a coating liquid to the annular belt, a second supply mechanism which supplies a cleaning liquid to the annular belt, a pan which has a discharge port and receives a liquid dropping from the annular belt to discharge the liquid through the discharge port, a first discharge channel which receives at a first receiving port the liquid discharged from the pan through the discharge port and discharges the liquid to a first discharge destination, a second discharge channel which receives at a second receiving port the liquid discharged from the pan through the discharge port and discharges the liquid to a second discharge destination, and a driving mechanism to position the discharge port above one of the first and second receiving ports. With this arrangement, the liquid discharged from the pan during coating and the liquid discharged from the pan during cleaning can be discharged or recovered separately by using the first and second discharge channels.

According to still another preferred embodiment of the present invention, for example, the driving mechanism is preferably configured to be able to move the discharge port to above one of the first and second receiving ports in accordance with an operation mode, e.g., a coating mode or cleaning mode.

A coating device according to still another preferred embodiment of the present invention comprises a control unit wherein, for example, the control unit controls the driving mechanism such that the discharge port is arranged above the first receiving port in an operation mode where the container on the conveyor is to be coated while supplying the cleaning liquid from the first supply mechanism to the annular belt, and that the discharge port is arranged above the second receiving port in an operation mode where the annular belt is to be cleaned while supplying the cleaning liquid from the second supply mechanism to the annular belt.

A coating device according to still another preferred embodiment of the present invention further comprises a support table which supports the annular belt and pan, wherein the driving mechanism can be configured to move the pan by moving the support table so as to position the discharge port above one of the first and second receiving ports.

According to still another preferred embodiment of the present invention, a coating device according to the present invention can be configured as a device comprising a pair of annular belts. Such a device can further comprise a second annular belt which is arranged on the other side of the annular belt (first annular belt) with reference to the conveyor as a center, a third supply mechanism which supplies a cleaning liquid to the second annular belt, a second pan which has a second discharge port and receives a liquid dropping from the second annular belt to discharge the liquid through the second discharge port, a third discharge channel which receives at a third receiving port the liquid discharged from the second pan through the second discharge port and discharges the liquid to one of the first discharge destination and a third discharge destination which is different from the first discharge destination, a fourth discharge channel which receives at a fourth receiving port the liquid discharged from the second pan through the second discharge port and discharges the liquid to one of the second discharge destination and a fourth discharge destination which is different from the second discharge destination, and a second driving mechanism to position the second discharge port above one of the third and fourth receiving ports.

Other features and advantages of the present invention will be apparent from the following description taken in conjunction with the accompanying drawings.

BEST MODE FOR CARRYING OUT THE INVENTION

A preferred embodiment of the present invention will be described hereinafter.

Figure 1:
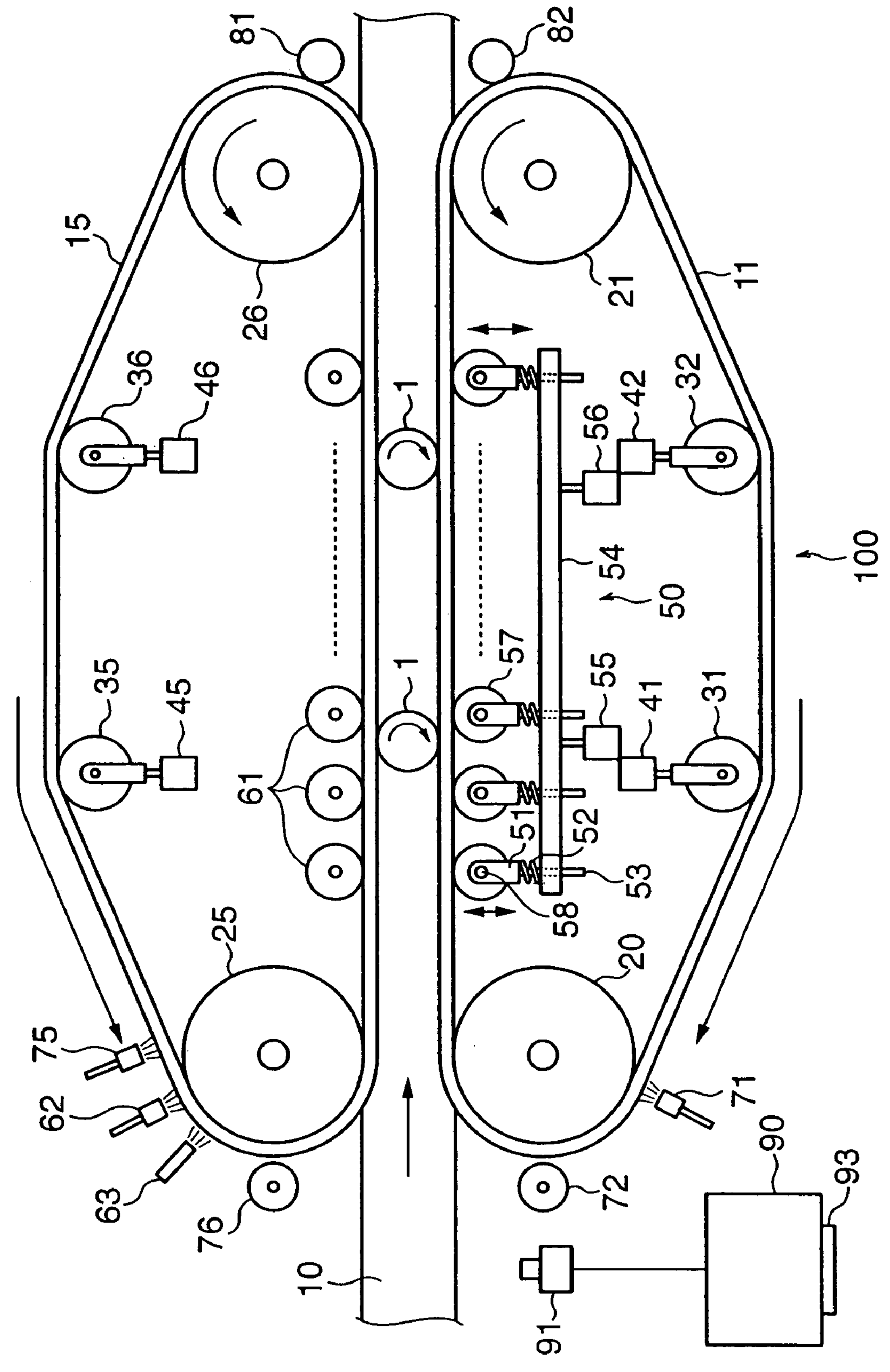
FIG. 1 is a plan view schematically showing the structure of a coating device according to a preferred embodiment of the present invention.
Figure 2:
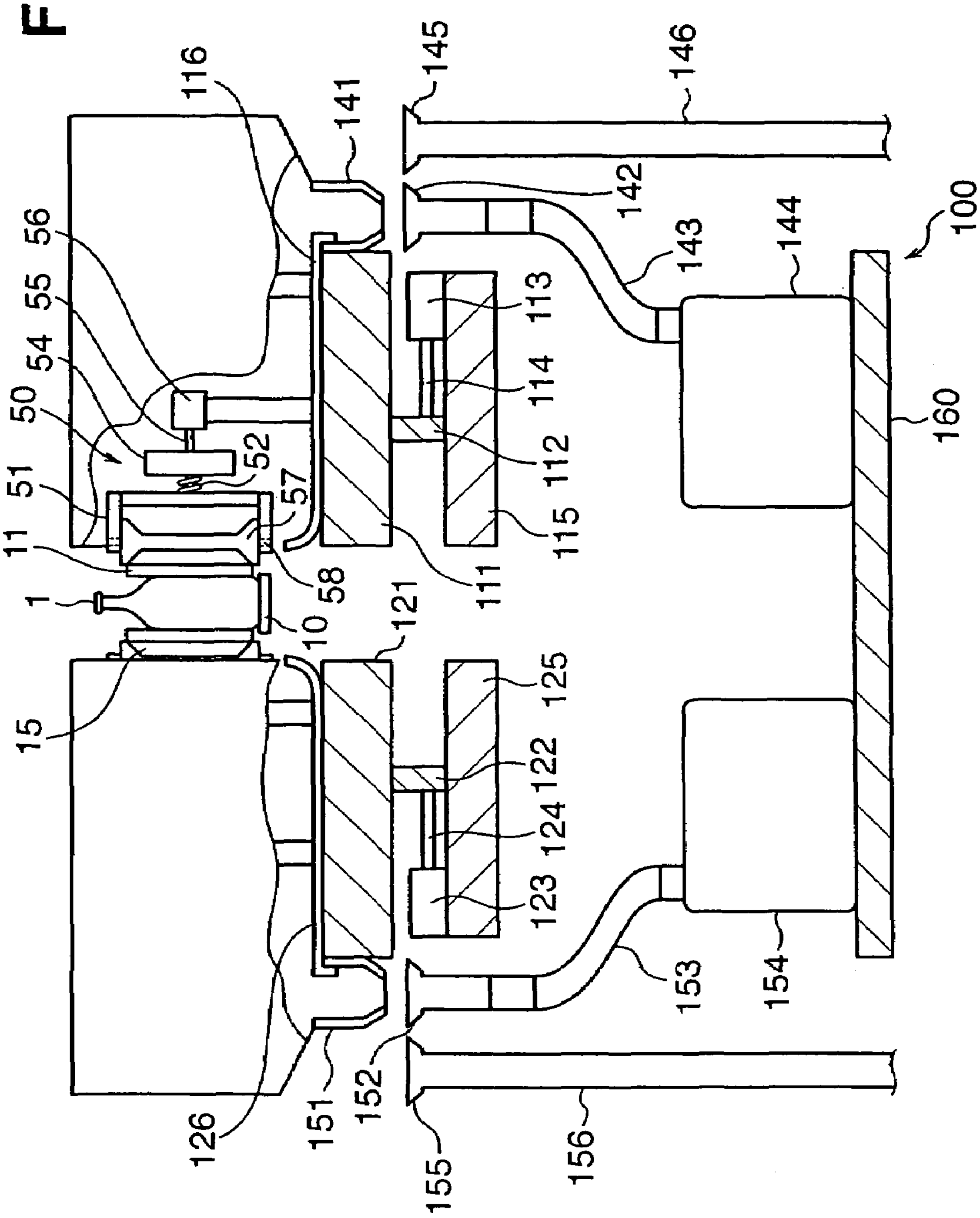
FIG. 2 is a view showing the layout during coating of the respective portions of the coating device shown in FIG. 1.
Figure 3:
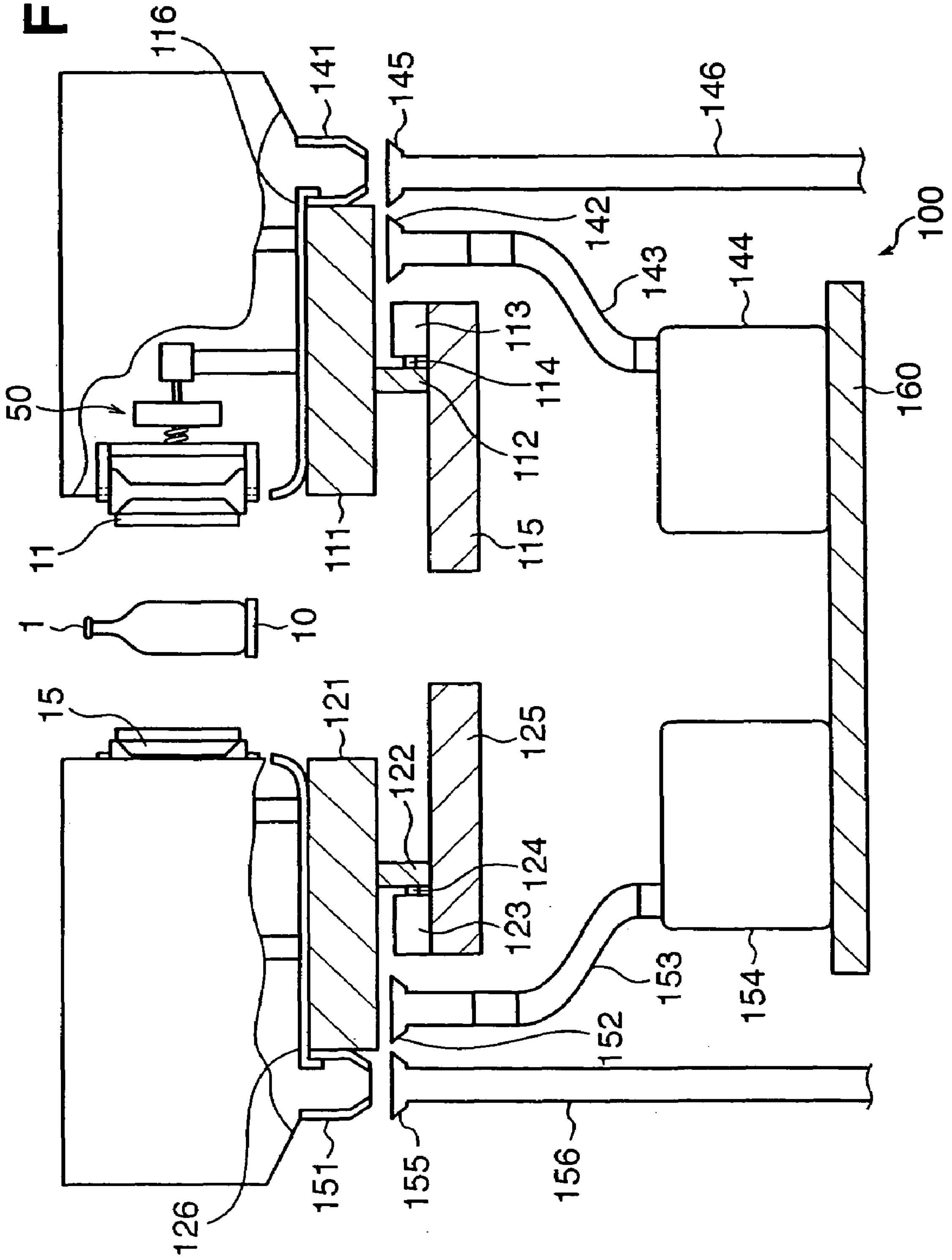
FIG. 3 is a view showing the layout during cleaning of the coating device shown in FIG. 1.

A coating device according to the present invention is suitable for coating, e.g., the surfaces of containers such as beer bottles. FIGS. 1 to 3 schematically show the structure of a coating device according to a preferred embodiment of the present invention, in which FIG. 1 is a plan view, and FIGS. 2 and 3 are partly sectional views for the sake of descriptive convenience.

A coating device 100 according to the preferred embodiment of the present invention is configured to coat the surfaces of the cylindrical portions of bottles 1 such as beer bottles. The bottles 1 as the coating target are conveyed at an appropriate interval by a conveyor 10 in a predetermined direction (to the right in FIG. 1). A pair of annular coating belts (annular belts) 11 and 15 are arranged on the two sides of the conveyor 10 to sandwich the bottles 1 on the conveyor 10. The pair of coating belts 11 and 15 are rotatably driven at such a relative speed that the bottles 1 which are placed on the conveyor 10 and conveyed in the predetermined direction rotate. For example, when the coating belt 11 is rotated at a low speed and the coating belt 15 is rotated at a speed higher than the speed of the coating belt 11, the bottles 1 on the conveyor 10 rotate clockwise while moving to the right in FIG. 1. When the bottles 1 are rotated in this manner, a coating liquid supplied to the surface of the coating belt 15 is applied to the entire cylindrical portions of the bottles 1.

In this arrangement example, the coating belt 15 is rotatably driven at a speed higher than that of the coating belt 11. The coating belt 15 which is driven at the high speed is looped around a driving pulley 26, a driven pulley 25, tension rollers 35 and 36, and a plurality of pressing rollers 61 which are arranged in a row. The tension rollers 35 and 36 apply a predetermined tension to the coating belt 15. The rotational speed of the coating belt 15 is detected by a sensor such as an encoder 81. A controller 90 compares the target rotational speed and the rotational speed detected by the sensor. When the two speeds are different, it is determined that an abnormality has occurred such as a slip of the coating belt 15. This information is informed to the operator.

A coating liquid supply unit 62 supplies the coating liquid to the surface of the coating belt 15. For example, the coating liquid supply unit 62 can be configured by arranging a plurality of nozzles, which spray the coating liquid to the coating belt 15, at a predetermined interval in the vertical direction. A brush 63 is arranged more downstream (downstream in the rotating direction of the belt 15) of the coating liquid supply unit 62, to uniform the coating liquid which is supplied to the surface of the coating belt 15 by the coating liquid supply unit 62.

During cleaning of the coating belt 15, a cleaning nozzle 75 sprays a cleaning liquid (e.g., detergent or hot water) to the coating belt 15. A hydroextracting roller 76 is arranged more downstream of the cleaning nozzle 75. During cleaning of the coating belt 15, the hydroextracting roller 76 is urged against the coating belt 15 to extract water from it.

The coating belt 11 which is driven at the low speed is looped around a driving pulley 21, a driven pulley 20, tension rollers 31 and 32, and a plurality of pressing rollers 57 which are arranged in a row. The rotational speed of the coating belt 11 is detected by a sensor such as an encoder 82. The controller 90 compares the target rotational speed and the rotational speed detected by the sensor. When the two speeds are different, it is determined that an abnormality has occurred such as a slip of the coating belt 11. This information is informed to the operator.

The positions of the pressing rollers 57 are adjusted by an adjusting mechanism 50 in accordance with the size (diameter) of the bottles 1 as the coating target. When the positions of the pressing rollers 57 are adjustable in this manner in accordance with the size of the bottles 1 as the coating target, a change in bottle size can quickly be coped with. Unlike in the prior art, the device need not be remodeled each time the bottle size is changed. Thus, the operation efficiency and operation hours can greatly increase.

The plurality of pressing rollers 57 are respectively axially supported by roller holders 51 to be rotatable about rotating shafts 58. The respective roller holders 51 are connected to rods 53. The rods 53 are reciprocally guided by a guide 54. The pressing rollers 57 are urged against the bottles 1 by a pressing mechanism such as springs 52.

For example, the adjusting mechanism 50 can be configured to include actuators such as pneumatic cylinders 55 and 56. In this arrangement example, the position of the guide 54 is adjusted by the two cylinders 55 and 56 in accordance with the bottle size. This adjusts the positions of the pressing rollers 57 or the gap between the coating belts 11 and 15.

The tension rollers 31 and 32 apply a predetermined tension to the coating belt 11. The positions of the tension rollers 31 and 32 are adjusted by actuators such as pneumatic cylinders 41 and 42 in accordance with the positions of the pressing rollers 57, i.e., the size of the bottles 1 as the coating target. Thus, a predetermined tension is applied to the coating belt 15 regardless of the bottle size. The adjustment of the positions of the tension rollers 31 and 32 in accordance with the positions of the pressing rollers 57 can be made by instructions from the controller 90 to the cylinders 55, 56, 41, and 42. Alternatively, the positions of the pressing rollers 57 and the positions of the tension rollers 31 and 32 may be adjusted by a structure in which a link mechanism links the guide 54 and the roller holders or the like which axially support the tension rollers 31 and 32 so that the pressing rollers 57 and tension rollers 31 and 32 move with a predetermined moving ratio.

The mechanism as described above to adjust the gap between the pair of coating belts 11 and 15 may be provided to either the coating belt 15 or both the coating belts 11 and 15.

In cleaning of the coating belt 11, a cleaning nozzle 71 sprays the cleaning liquid (e.g., detergent or hot water) to the coating belt 11. A hydroextracting roller 72 is arranged more downstream of the cleaning nozzle 71. During cleaning of the coating belt 11, the hydroextracting roller 72 is urged against the coating belt 11 to extract water from it.

In this arrangement example, the coating belt 11 is not provided with a coating liquid supply unit or brush. However, the coating belt 11 may also be provided with a coating liquid supply unit 62 and brush 63.

In an arrangement in which the coating belt 11 is also provided with the coating liquid supply unit 62 and brush 63, a guide member to guide the container 1 may be arranged in place of the coating belt 15. In this arrangement, the containers 1 on the conveyor 10 rotate as the coating belt 11 rotates. In this case, the coating belt 11 is preferably driven in the same direction as the conveyor 10 at its portion where it is in contact with the containers, such that the coating belt 11 moves at a speed higher than the speed of the conveyor 10.

The operation of the coating device 100, e.g., the position adjustment of the pressing rollers 57, the coating operation, cleaning operation, and the like are controlled by the controller 90. The size of the bottles as the coating target may be manually input from an operation panel 93 of the controller 90, input from another unit such as a host controller in the form of an electrical signal or instruction, or detected by the coating device 100. In the arrangement example shown in FIG. 1, a camera (e.g., a CCD camera) 91 and an image processor (not shown) are provided as a detector that detects the bottle size. The bottle size can be detected by processing the image of the bottles obtained by the camera 91 by the image processor. The bottle size detected in this manner may be used either to drive the adjusting mechanism 50 to match the bottle size, or to check against the bottle size which is input manually or input from another unit. In the latter case, when the detected bottle size and the input bottle size are different, an alarm or the like is produced, and the coating operation or its start can be stopped.

The coating device 100 according to this embodiment includes a mechanism which separately discharges or recovers the coating liquid dropping from the coating belts 11 and 15 or the like during coating and the coating liquid and cleaning liquid dropping from the coating belts 11 and 15 or the like during cleaning. This mechanism will be described hereinafter with reference to FIGS. 2 and 3. FIG. 2 shows the layout of the respective portions during coating (corresponding to a manufacture mode to be described later) of the containers, and FIG. 3 shows the layout of the respective portions during cleaning (corresponding to a closing mode to be described later) of the coating belts.

Drain pans 116 and 126 are arranged below the coating belts 11 and 15 to mainly recover the coating liquid and cleaning liquid dropping from the coating belts 11 and 15. Mechanical elements, e.g., the pulleys 20 and 21, tension rollers 31 and 32, pressing rollers 57, and adjusting mechanism 50, which are shown in FIG. 1 and related to support and drive of the coating belt 11 are arranged on the drain pan 116. Mechanical elements, e.g., the pulleys 25 and 26, tension rollers 35 and 36, and pressing rollers 67, which are shown in FIG. 1 and related to support and drive of the coating belt 15 are arranged on the drain pan 126.

The coating liquid and cleaning liquid recovered by the drain pans 116 and 126 respectively flow into discharge ports 141 and 151 provided to the drain pans 116 and 126. The drain pans 116 and 126 are respectively supported by support tables 111 and 121.

A member 112 guided by a guide table 115 is connected to the lower portion of the support table 111. When the member 112 is driven by an actuator such as a pneumatic cylinder 113, the support table 111 and a structure supported by it move in the horizontal direction.

Similarly, a member 122 guided by a guide table 125 is connected to the lower portion of the support table 121. When the member 122 is driven by an actuator such as a pneumatic cylinder 123, the support table 121 and a structure supported by it move in the horizontal direction.

When coating the containers, as shown in FIG. 2, structures including the support tables 111 and 121, the drain pans 116 and 126 supported by the support tables 111 and 121, and the like are respectively driven by the cylinders 113 and 123, such that first liquid receiving ports 142 and 152 are located below the discharge ports 141 and 151. In this state, the surfaces of the coating belts 11 and 15 are urged against the side surfaces of the bottles 1 on the conveyor 10. As the coating belts 11 and 15 rotate, the bottles 1 rotate. The entire outer surfaces of the bottles 1 are coated with the coating liquid which is provided to the coating belt 15 by the coating liquid supply unit 75 and uniformed by the brush 63.

The coating liquid drops from the coating belts 11 and 15, is recovered by the lower drain pans 116 and 126, and flows into the discharge ports 141 and 151. As described above, the first receiving ports 142 and 152 are arranged below the discharge ports 141 and 151. The coating liquid that has dropped through the discharge ports 141 and 151 is discharged to and recovered by coating liquid recovery containers (first discharge destinations) 144 and 154 through the first receiving ports 142 and 152 and first discharge channels (first pipes) 143 and 153 which are respectively connected to the first receiving ports 142 and 152. The recovered coating liquid can be reused after it is processed (e.g., by filtering) when necessary.

During cleaning of the coating belts 11 and 15, as shown in FIG. 3, structures including the support tables 111 and 121, the drain pans 116 and 126 supported by the support tables 111 and 121, and the like are respectively driven by the cylinders 113 and 123, such that second liquid receiving ports 145 and 155 are located below the discharge ports 141 and 151. In this state, the gap between the coating belts 11 and 15 is large. In the cleaning step of the coating belts 11 and 15, the cleaning nozzles 71 and 75 respectively spray the cleaning liquid (e.g., detergent or hot water) to the coating belts 11 and 15 to wash away the coating liquid attaching to the coating belts 11 and 15. Also, the hydroextracting rollers 72 and 76 are urged against the coating belts 11 and 15 to extract water from them.

The coating liquid and cleaning liquid washed off by cleaning drop from the coating belts 11 and 15 and hydroextracting rollers 72 and 76, are recovered by the lower drain pans 116 and 126, and flow into the discharge ports 141 and 151. As described above, the second receiving ports 145 and 155 are arranged under the discharge ports 141 and 151, respectively. The coating liquid and cleaning liquid which have dropped through the discharge ports 141 and 151 are fed to and recovered by a waste processing unit (second discharge destination) (not shown) through the second receiving ports 145 and 155 and second discharge channels (second pipes) 146 and 156 respectively connected to the second receiving ports 145 and 155. The recovered coating liquid and cleaning liquid are reused or discharged after they are processed by the waste processing unit.

In the arrangement example shown in FIGS. 2 and 3, the first discharge channels (first pipes) 143 and 153 are independent of each other. As the liquids which are discharged through the first discharge channels 143 and 153 are the coating liquid, the discharge channels (first pipes) 143 and 153 may be bundled into one and guided to one recovery container. Also, the second discharge channels (second pipes) 146 and 156 may also be bundled into one midway.

As described above, in the coating device according to the preferred embodiment of the present invention, during coating of the containers, the discharge ports 141 and 151 are moved relative to the first receiving ports 142 and 152 such that they are located above the first receiving ports 142 and 152 for discharging the coating liquid. During cleaning of the coating belts 11 and 15, the discharge ports 141 and 151 are moved relative to the first receiving ports 142 and 152 such that they are located above the second receiving ports 145 and 155 for discharging the cleaning liquid containing the coating liquid.

In place of moving the discharge ports 141 and 151 to switch the waste channel, the first receiving ports 142 and 152 and the second receiving ports 145 and 155 may be moved, thus switching the waste channel.

With this discharge or recovery mechanism, the channels 142, 143, and 144 (152, 153, and 154) for discharging and recovering the coating liquid and the channels 145 and 146 (155 and 156) for discharging and recovering the cleaning liquid containing the coating liquid during cleaning are formed completely independent of each other. Thus, valves for switching the channels are not required, and the maintenance, cleaning, and the like of the discharge or recovery mechanism can be facilitated.

In contrast to this, for example, assume a structure in which the discharge ports 141 and 151 are connected to a common pipe, the common pipe is branched into two pipes through a channel switching valve, and the two pipes are respectively guided to a coating liquid recovery container and a cleaning liquid (containing the coating liquid washed off by cleaning) discharge channel. In this structure, the coating liquid tends to clog in the valve easily, and maintenance and cleaning can take a very long period of time. In the structure using the valve, when coating is to be started after cleaning, as the valve is switched, the cleaning liquid staying in the common pipe (i.e., more upstream of the valve) connected to the discharge ports 141 and 151 may undesirably be recovered in the coating liquid recovery container.

Figure 4:
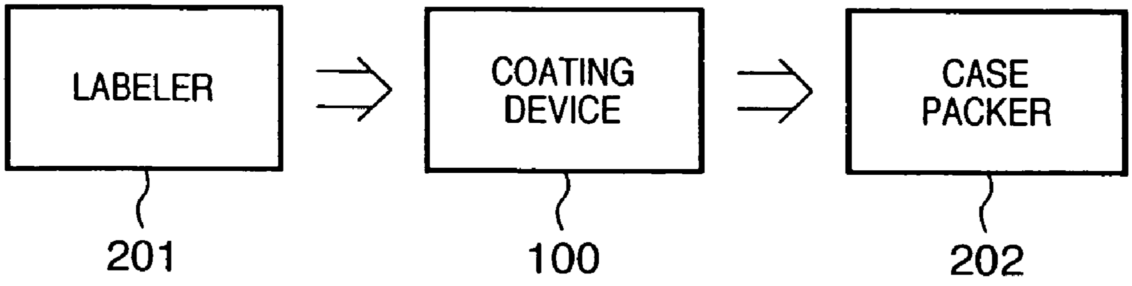
FIG. 4 is a view showing an example of the usage of the coating device shown in FIG. 1.

FIG. 4 is a view showing an example of the usage of the coating device 100. For example, the coating device 100 can be arranged between a labeler (a unit which labels the containers) 201 and a case packer (a unit which packs bottles in a case) 202. In this case, the coating device 100 coats the surfaces of the labeled bottles. Alternatively, the coating device 100 may be arranged to coat the bottles before labeling.

Figure 5:
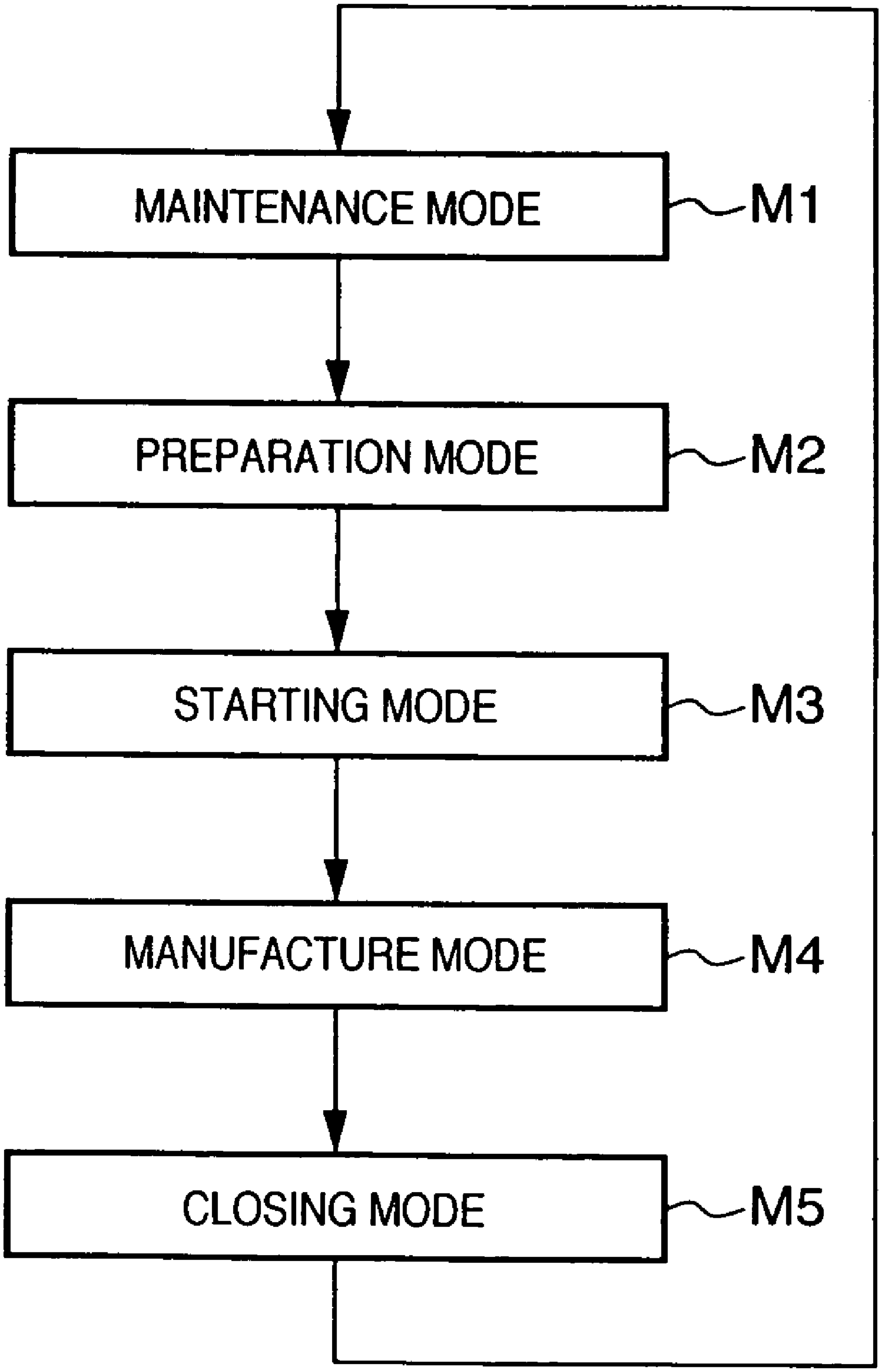
FIG. 5 is a chart showing a transition example of the operation mode of the coating device shown in FIG. 1.

FIG. 5 is a chart showing a transition example of the operation mode of the coating device 100. For example, the coating device 100 can perform a maintenance mode M1, preparation mode M2, starting mode M3, manufacture mode M4, and closing mode M5 in this order.

The maintenance mode M1 is a mode where the type (which can specify the size of the bottles) or the like of the bottles to be coated is input to the controller 90 to set the positions of the pressing rollers 57 (accordingly the gap between the coating belts 11 and 15) in accordance with the bottle size.

The preparation mode M2 is a mode where, e.g., the high-speed coating belt 15 is driven and the coating liquid is supplied by the coating liquid supply unit 62 to the coating belt 15 such that the coating belt 15 and the coating liquid have good affinity for each other.

The starting mode M3 is a mode where the conveyor 10, high-speed coating belt 15, low-speed coating belt 11, coating liquid supply unit 62, and the like are driven to prepare for bottle coating in the manufacture mode M4. In the starting mode M3, typically, a test bottle is coated so that whether or not coating will be performed well can be checked.

The manufacture mode M4 is a mode where the surfaces of the bottles 1 containing a beverage such as beer are coated.

The closing mode M5 is a mode where the conveyor 10 and coating liquid supply unit 62 are stopped to perform cleaning of the coating belts 11 and 15 and the like. In the closing mode M5, the positions of the pressing rollers 57 (accordingly the gap between the coating belts 11 and 15) may be switched in accordance with the type (size) of the bottles to be processed next. This switching is called type switching. The coating belts 11 and 15 are cleaned after the support tables 111 and 121 are set to the state shown in FIG. 3 from the state shown in FIG. 2. More specifically, prior to cleaning, the discharge ports 141 and 151 are respectively moved from above the first receiving ports 142 to 152 to above the second receiving ports 145 and 155. Cleaning is performed by spraying the cleaning liquid from the cleaning nozzles 71 and 75 to the coating belts 11 and 15, while rotating the coating belts 11 and 15, to wash away the coating liquid attaching to the coating belts 11 and 15, and urging the hydroextracting rollers 72 and 76 against the coating belts 11 and 15 to extract water from them.

According to the coating device of the present invention, for example, a change in size of the containers can quickly be coped with.

According to the coating device of the present invention, for example, there can be provided a coating device which has a function of separately discharging or recovering a liquid produced during coating and a liquid produced during cleaning and which can be maintained easily.

The invention claimed is:

1. A coating device which coats a container, comprising:

a conveyor which conveys the container;

first and second annular belts which are arranged on two sides of said conveyor to sandwich the container on said conveyor and configured to rotate the container on the conveyor;

an adjusting mechanism which adjusts a gap between opposing portions of said first and second annular belts in accordance with a size of the container to be coated;

a first supply mechanism which supplies a coating liquid to at least one of said first and second annular belts;

a second supply mechanism which supplies a cleaning liquid to said first and second annular belts;

a first pan which receives a liquid dropping from said first annular belt and discharges the liquid through a first discharge port;

a second pan which receives a liquid dropping from said second annular belt and discharges the liquid through a second discharge port;

a first discharge channel which receives at first receiving ports the liquid discharged through said first and second discharge ports and discharges the liquid to a first discharge destination;

a second discharge channel which receives at second receiving ports the liquid discharged through said first and second discharge ports and discharges the liquid to a second discharge destination; and a driving mechanism to arrange said first and second pans so as to position said first and second discharge ports above said first receiving ports in a coating mode of the container and so as to position said first and second discharge ports above said second receiving ports in a cleaning mode of said first and second annular belts, wherein said first annular belt is so arranged as to move together with said first pan, said second annular belt is so arranged as to move together with said second pan, and the gap between said first and second annular belts in the cleaning mode of said first and second belts is larger than that in the coating mode of the container by driving of said first and second pans by said driving mechanism.

2. The coating device according to claim 1, further comprising a movable tension roller to apply a predetermined tension to said first annular belt.

3. The coating device according to claim 2, further comprising a second adjusting mechanism which adjusts a position of said tension roller in accordance with one of the size of the container to be coated and a position of said adjusting roller.

4. The coating device according to claim 1, further comprising:

an input unit which loads information concerning the size of the container to be coated; and a control unit which operates said adjusting mechanism on the basis of the information loaded by said input unit.

5. The coating device according to claim 4, wherein said input unit includes a camera and is configured to obtain the size of the container by image-processing an image of the container sensed by said camera.

6. The coating device according to claim 1, further comprising:

first and second hydroextracting members, respectively, urged against said first and second annular belts in the cleaning mode of said first and second annular belts to hydroextract said first and second annular belts.

7. The coating device according to claim 1, further comprising an alarming unit which alarms an abnormality when the abnormality occurs in a rotational speed of said first and second annular belts.

* * * * *